(12) United States Patent
Jutz (10) Patent No.: US 12,095,199 B2
(45) Date of Patent: Sep. 17, 2024

(54) ELECTRIC CONNECTOR WITH SEALING BETWEEN JOINED HOUSING PARTS

(71) Applicant: Neutrik AG, Schaan (LI)

(72) Inventor: Bernhard Jutz, Feldkirch (AT)

(73) Assignee: Neutrik AG, Schaan (LI)

( * ) Notice: Subject to any disclaimer, the term of this patent is extended or adjusted under 35 U.S.C. 154(b) by 299 days.

(21) Appl. No.: 17/761,263

(22) PCT Filed: Sep. 11, 2020

(86) PCT No.: PCT/EP2020/025412
§ 371 (c)(1),
(2) Date: Mar. 17, 2022

(87) PCT Pub. No.: WO2021/052625
PCT Pub. Date: Mar. 25, 2021

(65) Prior Publication Data
US 2022/0376430 A1   Nov. 24, 2022

(30) Foreign Application Priority Data

Sep. 17, 2019   (AT) .............................. A 50805/2019

(51) Int. Cl.
*H01R 13/52*   (2006.01)
*H01R 13/504*   (2006.01)
*H01R 43/02*   (2006.01)

(52) U.S. Cl.
CPC ....... *H01R 13/5202* (2013.01); *H01R 13/504* (2013.01); *H01R 43/0207* (2013.01)

(58) Field of Classification Search
CPC .............. H01R 13/5202; H01R 13/504; H01R 43/0207; H01R 13/516; H01R 13/746; H01R 13/502; B29C 65/08; B29C 66/54; B29L 2031/36; Y02T 10/70; Y02T 10/7072; Y02T 90/14
See application file for complete search history.

(56) References Cited

U.S. PATENT DOCUMENTS

| 5,681,409 A | 10/1997 | Lin et al. |
| 7,008,271 B2 | 3/2006 | Jorgensen |
| 9,577,363 B2 | 2/2017 | Lutz et al. |

(Continued)

FOREIGN PATENT DOCUMENTS

| CN | 205828780 U | 12/2016 |
| CN | 206004048 U | 3/2017 |

(Continued)

OTHER PUBLICATIONS

International Search Report and Written Opinion for International Patent Application No. PCT/EP2020/025412 issued on Mar. 25, 2021.

*Primary Examiner* — Travis S Chambers
(74) *Attorney, Agent, or Firm* — Volpe Koenig (57) ABSTRACT

The disclosure relates to an electrical plug connector, comprising two housing parts, which are connected in a sealing manner on flat contact surfaces. A first housing part is, on its contact surface, equipped with an annular sealing edge directed at the opposite housing part. A second housing part is, on its contact surface, equipped with an annular seal corresponding to the sealing edge. The housing parts may be unreleasably connected to one another at multiple locations radially outside the seal and the sealing edge.

20 Claims, 4 Drawing Sheets

(56) References Cited

U.S. PATENT DOCUMENTS

2002/0093830 A1    7/2002   Alloway et al.
2020/0220298 A1    7/2020   Zhang et al.

FOREIGN PATENT DOCUMENTS

| CN | 207967450 U | 10/2018 | |
|---|---|---|---|
| DE | 102013224296 A1 | 5/2015 | |
| DE | 102015113519 A1 | 2/2017 | |
| DE | 202018105147 U1 | 12/2018 | |
| EP | 1450445 A1 | 8/2004 | |
| EP | 1524731 A1 * | 4/2005 | ......... H01R 13/5202 |
| EP | 3490077 A1 | 5/2019 | |
| JP | 2017191643 A | 10/2017 | |
| JP | 2020113535 | 7/2020 | |
| TW | 1669860 B | 8/2019 | |
| TW | 583637 U | 9/2019 | |

* cited by examiner

ELECTRIC CONNECTOR WITH SEALING BETWEEN JOINED HOUSING PARTS

CROSS-REFERENCE TO RELATED APPLICATIONS

This application is a U.S. National phase based on, and claiming priority to, PCT/EP2020/025412, filed on Sep. 11, 2020 entitled "ELECTRIC CONNECTOR," which is based on and claims priority to Austrian Patent Application No. A50805/2019, filed on Sep. 17, 2019, each of which are hereby incorporated by reference in their entirety.

BACKGROUND

The disclosure relates to an electrical plug connector, comprising electrical contact elements and two housing parts, which are connected to one another on flat contact surfaces abutting one another in a sealing manner.

The two housing parts may include built-in plug connectors, also referred to as chassis sockets, which are provided for being mounted in devices, control panels, or the like, and may be connected in a fixed manner upon installation. This is effected by fastening screws, by means of which the built-in plug connector is fastened to the wall of the device, the control panel, or the like, which wall simultaneously also clamps the flange plate visible to the outside to the connecting flange on the housing. Possibly, further components, in particular a seal, are also clamped between the flange plate and the connecting flange. An example of a built-in plug connector with a complex structure and assembly is disclosed in CN 205828780 U.

JP 2017191643 A discloses a charging plug for vehicles, with a two-part housing, wherein a seal is inserted between the housing parts adhered to one another. This seal is located, as a socket-shaped ring sealing in a real manner, between sealing surfaces of the housing parts, which sealing surfaces are formed by annular sections of the housing parts plugged into one another, which, however, requires a significant effort for the exact positioning during assembly in order to ensure the sealing effect. One of the housing parts is designed to be essentially pot-shaped, and the second housing part is provided with a mounting flange.

EP 1 450 445 A1 discloses a plug connector arrangement in the form of a plug socket, the housing of which consists of two housing parts, which are connected to one another. An embodiment of such a plug socket has at least two flat contact surfaces abutting one another, which are oriented essentially perpendicular to the longitudinal axis of the housing parts. A plate-shaped seal with a sealing beading that is circumferential outside the openings for the contact elements is received between the contact surfaces. The seal is slightly smaller than the contact surfaces, wherein the housing parts are connected to one another radially outside the seal by means of ultrasonic welding.

TW 202 010 194 A discloses a watertight housing for an electronic device, which housing consists of two housing parts, which are unreleasably connected to one another by means of ultrasonic welding. One of the housing parts has a circumferential projection, which rests on a flat, circumferential contact surface of the second housing part. Welding material is received therebetween. A seal is located annularly between walls of the housing parts in the form of a cylindrical casing, which are plugged into one another.

An electrical plug connector is part of the device disclosed in EP 3 490 077 A1, wherein this plug connector is assembled with the use of two housing parts. A seal is provided, in order to seal the connection with a further plug connector. A section of said seal is arranged between the housing parts, which, according to a possible embodiment, may also be connected by means of welding methods.

DE 20 2018 105 147 U1 describes a watertight housing of a charger device, which is assembled from a pot-shaped first housing part and a flat, cover-shaped second housing part. The contacts are guided outwards through the flat cover, which is connected to the first housing part by means of ultrasonic welding.

TW M 583 637 U discloses a built-in plug connector, in which a seal is present, but which has no locking arrangement, which also comprises the region for mounting bores for the housing of the plug connector, for a complementary plug connector whatsoever. The seal is inserted between a flange plate and the plug connector housing.

Moreover, it is known, for example from US 2002093830 A1 for bulbholders in the automotive field, or from DE 102013224296 A1 in the field of electrical plug devices, to connect housing parts by means of ultrasonic welding. U.S. Pat. No. 5,681,409 A discloses the connection of two housing parts of a plug housing by means of ultrasonic welding, wherein the housing parts are joined without a seal being inserted between them.

An object of the present disclosure was to overcome the shortcomings of the prior art and to provide a device representing an optimally sealed plug connector with easy handling and a simple and quick mounting with only few components.

This object is achieved by means of a device and a method according to the claims.

The device according to the disclosure is characterized in that a first housing part atop its contact surface is equipped with an annular sealing edge directed at the opposite housing part, and wherein a second housing part on its contact surface is equipped with an annular seal corresponding with the sealing edge, and wherein the housing parts are unreleasably connected to one another at multiple locations radially outside the seal and the sealing edge. The paring of sealing edge and seal results in the desired optimal sealing effect, and by connecting the two housing parts, one single component is created, which can be handled, mounted, and possibly also dismounted like a product that has always been a single piece.

In this regard, preferably, raised ribs, which are arranged coaxially to the seal and/or sealing edge and spaced apart from one another in the circumferential direction are formed on one of the housing parts, and indentations with corresponding dimensions are formed on the opposite housing part at corresponding locations. These structures enable the exact orientation of the two housing part to be connected relative to one another in the plane of the contact surfaces.

According to a particularly advantageous embodiment of the disclosure, with this, the connection of the housing parts in the region of the ribs and indentations is established. Due to the geometric conditions, a particularly good material contact is given in this region, which material contact strongly facilitates the establishment of the connection of the two housing parts, be it in the case of adhering or other bonding methods.

An embodiment, in which the connection of the housing parts is established by means of ultrasonic welding is particularly favorable and safe.

A particularly advantageous embodiment for plug connectors, in particular for built-in plug connectors, provides that the first housing part has a pot-like design, wherein a base opposite the front side with the seal is provided with passage openings for guiding the contact elements through. Thereby, a variety of types of well-insulated built-in plugs or other male parts of plug connections can be produced.

These types of plug connectors may be constructed with a separately-made base of the first housing part, which is connected to a circumferential wall of the first housing part along an annular connection region.

Here, as well, a particularly quick and safe type of connection is possible if the base of the first housing part is connected over the entire surface to the wall of the first housing part by means of ultrasonic welding.

For the production of female parts of plug connections, in particular of chassis sockets, a simple and quick solution is characterized in that the first housing part has a circumferential wall, which forms a receiving opening, in which a contact carrier with receiving bores for the electrical contact elements is inserted and fixed.

Preferably, the contact carrier has, in this regard, a circumferential projection, which rests on the end face of the circumferential wall and is connected thereto. Preferably, a full-surface connection is realized in this regard by means of ultrasonic welding.

A further advantageous embodiment according to the disclosure is characterized in that a locking mechanism is arranged inside one of the housing parts, wherein an unlocking element projects outward through a feed-through in the other housing part.

The annular seal of the one housing part is, in this regard, adapted for additionally sealing this feed-through, as well, in that it also surrounds the feed-through with a radial protrusion having a passage opening, and the sealing edge of the housing part also encloses the region of the feed-through with a radial protrusion.

Preferably, for further optimizing the sealing of the plug connector, it is provided according to the disclosure that further sealing elements are formed on the seal, which sealing elements extend into the region of mounting bores or circumferential edges of one of the housing parts.

A plug connector according to the disclosure is advantageously constructed as a built-in plug connector such that a first housing part is designed as a housing of a built-in plug connector, and a second housing part is designed as a flange plate of said built-in plug connector, which is provided with at least one insertion opening and with at least one mounting bore for being fastened to a device wall, control panel, or the like. Thereby, built-in plug connectors, which are optimally sealed and easy to handle as well as quick to mount, are produced.

In this regard, a comprehensive sealing arrangement is provided for an optimal sealing effect, which sealing arrangement is inserted in the second housing part designed as a flange plate on its rear side facing the first housing part, which sealing arrangement comprises at least an annular seal around the insertion opening and preferably with integrally formed sealing elements for the mounting openings and/or a seal extending circumferentially along the edge region and bent back and protruding in the direction of the first housing part.

In this regard, the integral elements of the sealing arrangement are designed so as to be connected in one piece with the annular seal cooperating with the sealing edge by means of at least one radially extending connection piece.

BRIEF DESCRIPTION OF THE DRAWINGS

For the purpose of better understanding of the disclosure, it will be elucidated in more detail by means of the figures below. These show in a respectively very simplified schematic representation.

DETAILED DESCRIPTION

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, these specifications of location are to be analogously transferred to the new position.

Figure 1:
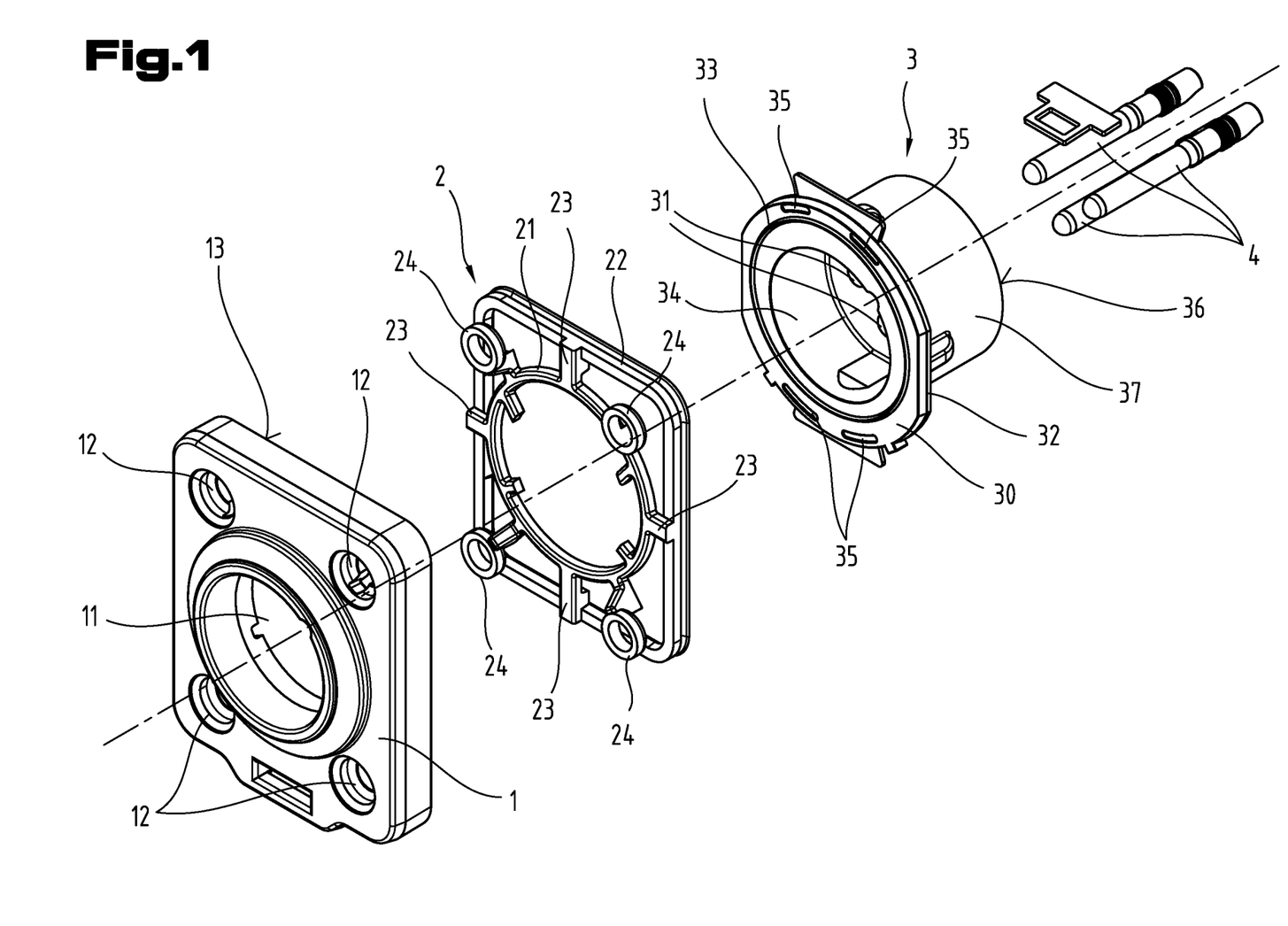
FIG. 1 an exploded view of a built-in plug connector according to the disclosure.

FIG. 1 shows a first embodiment according to the disclosure of a plug connector in the form of a built-in plug, i.e. a male part of a plug connection provided for being installed in a device, a control panel, or the like. This built-in plug basically consists of the flange plate 1, the seal 2, the housing 3 and the electrical contacts 4, as counted from the outside inward toward the device.

The flange plate 1 has an insertion opening 11 for a complementary plug connector as well as mounting bores 12, through which, in an installed state, fastening means, preferably fastening screws, are guided and are anchored in the wall of a device, a control panel, or the like.

On the rear side of the flange plate 1 (see FIG. 2), which, in the installed state, faces the device wall or the like and possibly completely abuts thereon, a sealing arrangement 2 is present. This is preferably inserted in indentations on the rear side of the flange plate 1 or is molded therein. The rear end of the flange plate 1 also comprises an essentially flat contact surface 14, on which, in the assembled state, the housing 3 comes to rest. In this regard, the contact surface 14 is oriented essentially perpendicular to the longitudinal axis of the flange plate 1.

Figure 2:
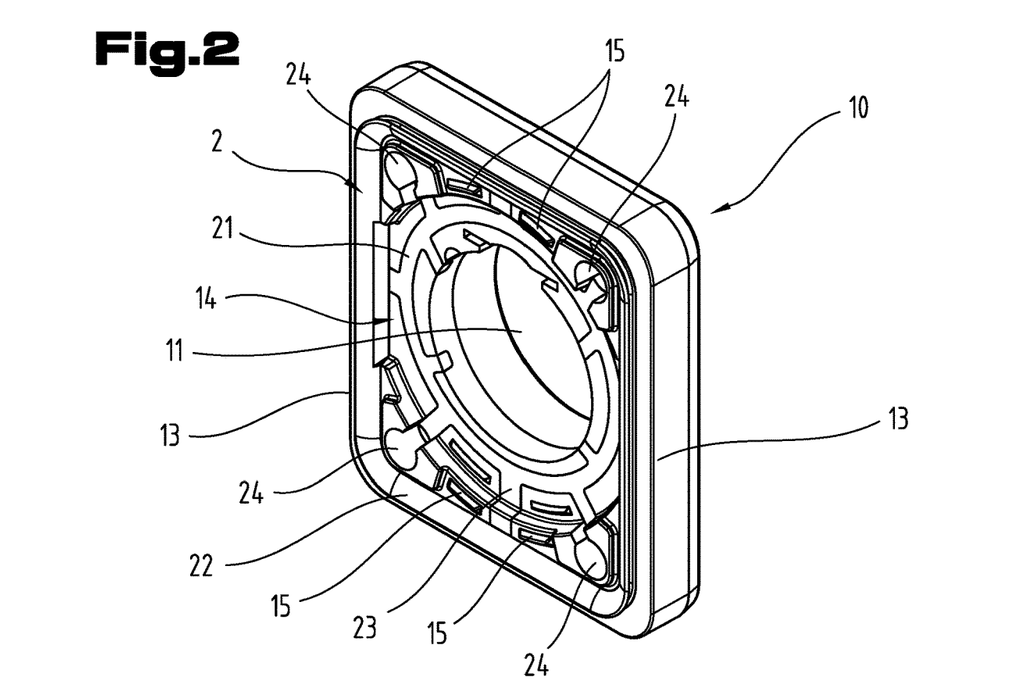
FIG. 2 a perspective rear view of the flange plate of the built-in plug of FIG. 1 with an inserted sealing arrangement.

The sealing arrangement 2 comprises at least an annular seal 21, which surrounds the insertion opening 11 in an annular manner. Advantageously, a peripheral seal 22 connecting to the edge 13 of the flange plate 1 is provided for sealing the edge region of the built-in plug connector. In order to optimize this sealing effect, a sealing lip 25 (FIG. 3) may optionally be formed on the edge or the rim of the peripheral seal 22. In this regard, the seal 21 also abuts on the flange plate 1 in an essentially flat configuration parallel to the flat contact surface 14.

In this regard, it may be preferred for increasing the mechanical resistance that the annular seal 21 and the peripheral seal 22 are connected to one another by means of radial webs 23. The seal 21, peripheral seal 22, and the radial webs 23 are formed in one piece in this regard. The sealing arrangement 2 may alternatively have further sealing elements formed onto the seal 21, in particular sealing elements 24 for the regions of the mounting bores 12 of the flange plate 1.

The housing 3 with its feed-throughs 31 for the contact pins 4 has on its front side facing the rear side of the flange plate 1 a connecting flange 32, the front side of which is an essentially flat contact surface 30 for abutting on the rear side of the flange plate 1, in particular on its contact surface 14. This contact surface 30, as well, is also oriented essentially perpendicular to the longitudinal axis of the housing 3, in parallel with the contact surface 14 of the flange plate 1. On the contact surface 30 of the connecting flange 32, an annular sealing edge 33 is present, which is directed at the seal 21, surrounds the insertion opening 34 of the housing 3 in an annular manner, and is pressed into the seal 21 when the built-in plug connector is in the assembled state. The sealing edge 33 and the seal 21 are arranged so as to correspond with respect to circumference, width, and position.

Between the essentially flat contact surfaces 14, 30, the entire sealing arrangement 2 is also present in an essentially areal, flat form and is oriented essentially perpendicular to the longitudinal axis of the housing and the flange plate 1, in a similar manner as the contact surfaces 14, 30.

In the front side of the connecting flange 32, indentations 35, preferably short grooves in the form of arcs, are formed at multiple locations radially outside the seal 21 and the sealing edge 33. In the assembled state, the rear side of the flange plate 1 has at corresponding locations correspondingly formed ribs 15 with corresponding dimensions, engaging with the grooves, when the flange plate 1 and the housing 3 abut one another with their contact surfaces 14, 30. The flange plate 1 and the housing 3 may be unreleasably connected in the regions of these indentations 35 and ribs 15, preferably by means of ultrasonic welding, or also by means of adhering or similar methods.

Figure 3:
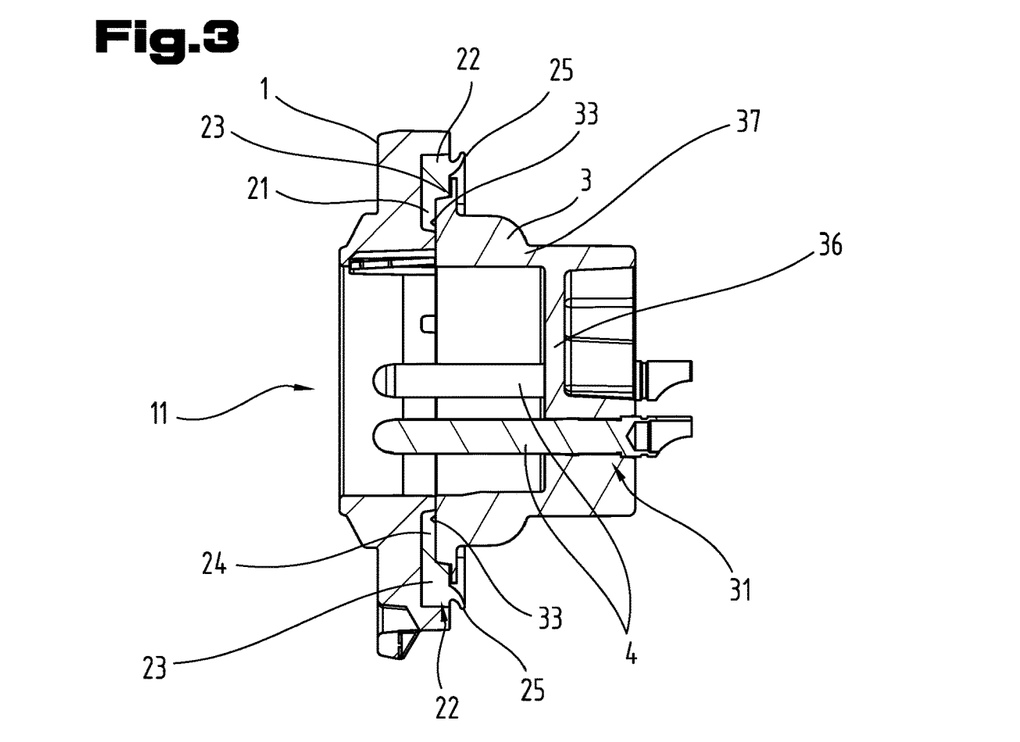
FIG. 3 a longitudinal section through the chassis plug of FIG. 1.

The housing 3 shown in FIGS. 1 and 3 is designed in the shape of a pot, wherein on the front side with insertion opening 34 and the connecting flange 32, a base 36 with the passage openings 31 for guiding the contact pins 4 through closes the housing 3. This base 36 is preferably an initially separately made component, which is connected to a circumferential wall 37 of the housing 3 along an annular connection region. Here, as well, ultrasonic welding is preferably used. Of course, the wall 37 and the base 36 may also be formed in one piece.

Figure 4:
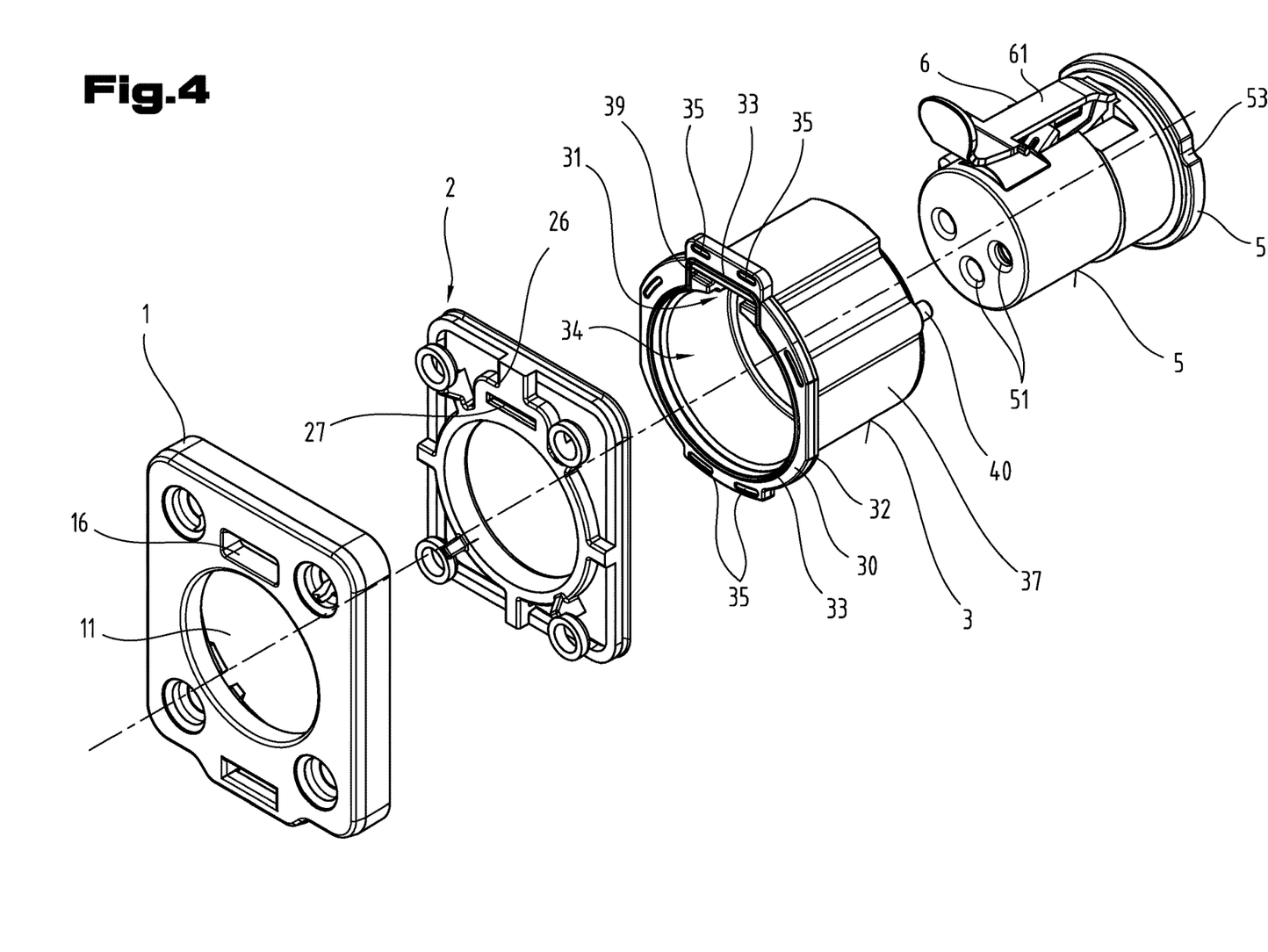
FIG. 4 an exploded view of a socket according to the disclosure.
Figure 5:
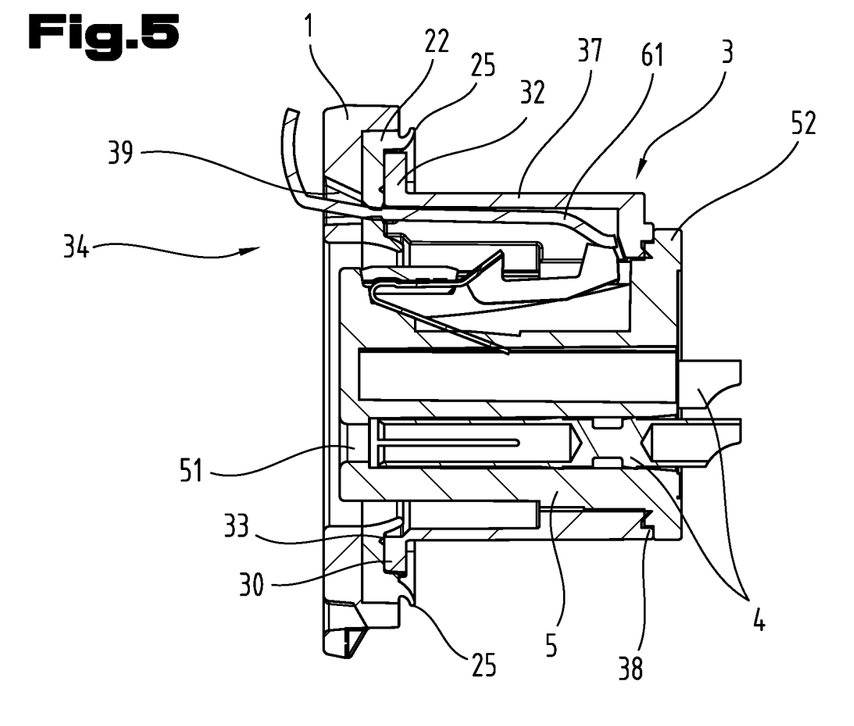
FIG. 5 a longitudinal section through the socket of FIG. 4.

FIGS. 4 and 5 show a further embodiment according to the disclosure, namely a female built-in plug connector, also referred to as a chassis socket. A contact carrier 5 is inserted into the inside of the circumferential wall 37 of the housing 3, which contact carrier 5 comprises receiving bores 51 for the electrical contacts 4—and from the direction of the insertion openings 11 and 34—for the contact pins of a complementary plug connector. Preferably, a circumferential projection 52 is provided on the rear end of the contact carrier 5, with which projection 52 the contact carrier 5 abuts on a rear end face 38 of the circumferential wall 37 and is connected thereto. Here, as well, ultrasonic welding is preferably used as a full-surface bonding. In order to ensure the correct orientation of the contact carrier 5 in the housing 3, a dowel pin 40 is arranged on the rear side of the housing 3. In the projection 52, a recess 53 is formed, with which the dowel pin 40 engages when the contact carrier 5 is inserted, and thus ensures the correct positioning about the central axis of the built-in plug connector.

A locking mechanism 6 is also provided on and connected to the contact carrier 5, so that, in the assembled state, it is arranged inside the housing 3. In order to be able to release the plug connection as needed, an unlocking element 61 is provided, which has to project outward on the front side of the flange plate 1 so the user may actuate it. In this regard, the circumferential wall 37 is radially extended outwards for receiving the unlocking element 61, and the insertion opening 34 has a radial recess 39, through which the unlocking element 61 protrudes towards the front side of the housing 3. The flange plate 1 also has a passage opening 16 for the unlocking element 61, and the seal 21, as well, is provided with a radial extension 26, in which a passage opening 27 for the unlocking element 61 is arranged so as to align with the recess 39 and the passage opening 16 of the flange plate 1.

The exemplary embodiments show possible embodiment variants, and it should be noted in this respect that the disclosure is not restricted to these particular illustrated embodiment variants of it, but that rather also various combinations of the individual embodiment variants are possible and that this possibility of variation owing to the technical teaching provided by the present disclosure lies within the ability of the person skilled in the art in this technical field.

The scope of protection is determined by the claims. Nevertheless, the description and drawings are to be used for construing the claims. Individual features or feature combinations from the different exemplary embodiments shown and described may represent independent inventive solutions. The object underlying the independent inventive solutions may be gathered from the description.

All indications regarding ranges of values in the present description are to be understood such that these also comprise random and all partial ranges from it, for example, the indication 1 to 10 is to be understood such that it comprises all partial ranges based on the lower limit 1 and the upper limit 10, i.e. all partial ranges start with a lower limit of 1 or larger and end with an upper limit of 10 or less, for example 1 through 1.7, or 3.2 through 8.1, or 5.5 through 10.

Finally, as a matter of form, it should be noted that for ease of understanding of the structure, elements are partially not depicted to scale and/or are enlarged and/or are reduced in size.

LIST OF REFERENCE NUMBERS

1 Flange plate
2 Sealing arrangement
3 Housing
4 Contact/Contact pin
5 Contact carrier insert
6 Locking mechanism
7
8
9
10
11 Insertion opening
12 Mounting bore
13 Outer edge
14 Contact surface
15 Rib
16 Passage opening
17
18
19
20
21 Seal
22 Peripheral seal
23 Web
24 Sealing element
25 Sealing lip
26 Radial extension
27 Passage opening
28

29
30 Contact surface
31 Feed-throughs
32 Connecting flange
33 Sealing edge
34 insertion opening
35 Recess
36 Base
37 Wall
38 Rear end face
39 Recess
40 Dowel pin
41
42
43
44
45
46
47
48
49
50
51 Receiving bore
52 Projection
53 Recess
54
55
56
57
58
59
60
61 unlocking element
62
63
64
65

What is claimed is:

1. An electrical plug connector, comprising electrical contact elements, two housing parts, which are connected in a sealing manner on flat contact surfaces abutting en one another, and wherein a seal is received between the contact surfaces, wherein the contact surfaces are oriented essentially perpendicular to a longitudinal axis of the housing parts and are unreleasably connected to one another at multiple locations radially outside the seal, characterized in that a first housing part atop its contact surface is equipped with an annular sealing edge directed at the opposite housing part, and wherein a second housing part on its contact surface is equipped with the seal, which is designed to be corresponding with the sealing edge, and wherein the housing parts are connected to one another at multiple locations radially outside the sealing edge.

2. The plug connector as claimed in claim 1, wherein the raised ribs, which are arranged coaxially to the seal and/or sealing edge and spaced apart from one another in the circumferential direction are formed on one of the housing parts, and indentations with corresponding dimensions are formed on an opposite housing part at corresponding locations.

3. The plug connector as claimed in claim 2, wherein the connection of the housing parts is established in a region of ribs and indentations.

4. The plug connector as claimed in claim 1, wherein a connection of the housing parts is established by means of ultrasonic welding.

5. The plug connector as claimed in claim 1, wherein the first housing part has a pot-like shaped design, wherein a base opposite a front side is provided with passage openings for guiding through contact elements.

6. The plug connector as claimed in claim 5, wherein the base of the first housing part is a component that is produced separately and is connected to a circumferential wall of the first housing part along an annular connection region.

7. The plug connector as claimed in claim 6, wherein the base of the first housing part is connected to the wall of the first housing part over a full surface by means of ultrasonic welding.

8. The plug connector as claimed in claim 1, wherein the first housing part has a circumferential wall, which forms a receiving opening, in which a contact carrier with receiving bores for the electrical contact elements are inserted and fixed.

9. The plug connector as claimed in claim 8, wherein the contact carrier has a circumferential projection, which rests on and is connected to an end face of a circumferential wall, by means of ultrasonic welding.

10. The plug connector as claimed in claim 1, wherein a locking mechanism is arranged inside one of the housing parts, and wherein an unlocking element projects outward through a feed-through in the other housing part.

11. The plug connector as claimed in claim 10, wherein the seal also surrounds the feed-through with a radial protrusion with a passage opening, and the sealing edge of the housing part encloses the feed-through with a radial protrusion.

12. The plug connector as claimed in claim 1, further comprising sealing elements that are formed on the seal, the sealing elements extend into a region of mounting bores or circumferential edges of one of the housing parts.

13. The plug connector as claimed in claim 1, wherein a first housing part is designed as a housing of a built-in plug connector, and a second housing part is designed as a flange plate of said built-in plug connector, which is provided with at least one insertion opening and with at least one mounting bore for being fastened to a device wall, or control panel.

14. The plug connector as claimed in claim 13, wherein the second housing part includes a flange plate on its rear side facing the first housing part, a sealing arrangement comprises an annular seal and integrally formed sealing elements for mounting openings and/or a peripheral seal extending circumferentially along an edge region and bent back and protruding in the direction of the first housing part.

15. The plug connector as claimed in claim 14, wherein integral elements of the sealing arrangement are configured to be connected in one piece with the annular seal cooperating with a sealing edge by at least one radially extending connection piece.

16. An electrical plug connector comprising:
electrical contact elements;
first and second housing components connected in a sealing manner on flat contact surfaces abutting one another; and
a seal is received between the contact surfaces, wherein the contact surfaces are oriented essentially perpendicular to a longitudinal axis of the housing components and are connected to one another at multiple locations radially outside the seal,
wherein the first housing component is equipped with an annular sealing edge directed at the second housing component,
wherein the second housing component on its contact surface is equipped with the seal, and wherein the housing components are connected to one another at multiple locations radially outside the sealing edge.

17. The electrical plug connector as claimed in claim 16, further comprising raised ribs aligned with the seal and spaced apart from one another in a circumferential direction.

18. The electrical plug connector as claimed in claim 16, wherein the first housing component has a circumferential wall which forms a receiving opening in which a contact carrier is configured to be inserted.

19. An electrical plug connector comprising:
  first and second housing components connected in a sealing manner on flat contact surfaces abutting one another; and
  a seal is received between the contact surfaces, wherein the contact surfaces are oriented essentially perpendicular to a longitudinal axis of the housing components and are connected to one another at multiple locations radially outside the seal,
  wherein the first housing component is equipped with an annular sealing edge directed at the second housing component, and
  wherein the housing components are connected to one another at multiple locations radially outside the sealing edge.

20. The electrical plug connector as claimed in claim 19, further comprising a locking mechanism that is arranged inside one of the housing components, and wherein an unlocking element projects outward through a feed-through in the other housing component.

* * * * *